(12) United States Patent
Wang

(10) Patent No.: US 11,955,922 B2
(45) Date of Patent: Apr. 9, 2024

(54) SOLAR DEVICE WITH INCLINATION ADJUSTING SUPPORT ASSEMBLY

(71) Applicant: XIAMEN DONESTY ECOMMERCE CO., LTD., Fujian (CN)

(72) Inventor: Hao Wang, Fujian (CN)

(73) Assignee: XIAMEN DONESTY ECOMMERCE CO., LTD., Fujian (CN)

( * ) Notice: Subject to any disclaimer, the term of this patent is extended or adjusted under 35 U.S.C. 154(b) by 205 days.

(21) Appl. No.: 17/525,987

(22) Filed: Nov. 15, 2021

(65) Prior Publication Data

US 2023/0092692 A1 Mar. 23, 2023

(30) Foreign Application Priority Data

Sep. 23, 2021 (CN) .......................... 202122310242.9

(51) Int. Cl.
*H02S 20/30* (2014.01)
*F16M 11/20* (2006.01)

(52) U.S. Cl.
CPC ......... *H02S 20/30* (2014.12); *F16M 11/2021* (2013.01)

(58) Field of Classification Search
CPC ......... Y02E 10/50; Y02E 10/47; H02S 20/30; H02S 10/40; H02S 30/20; F16M 11/2021
See application file for complete search history.

(56) References Cited

U.S. PATENT DOCUMENTS

| 2,449,907 | A | * | 9/1948 | Olin | A47G 1/142 |
| | | | | | 248/463 |
| 4,413,033 | A | * | 11/1983 | Weichman | B60J 10/32 |
| | | | | | 49/490.1 |
| 4,555,084 | A | * | 11/1985 | Anderson | A47B 25/00 |
| | | | | | 248/455 |
| 5,720,465 | A | * | 2/1998 | Peltzer | A47B 23/02 |
| | | | | | 248/455 |

(Continued)

OTHER PUBLICATIONS

Gripper Clip (https://web.archive.org/web/20210615215543/https://gibsongoodtools.com/, Jun. 15, 2021).*

(Continued)

*Primary Examiner* — Brian E Glessner
*Assistant Examiner* — Daniel J Kenny
(74) *Attorney, Agent, or Firm* — Samson G. Yu

(57) ABSTRACT

The disclosure provides a solar device. The solar device includes: a solar panel, having a first surface and a second surface arranged oppositely; and a support assembly, used to support the solar panel, herein the support assembly includes a support base and a support rod, the support base is arranged on the second surface, the support base is provided with an upper mounting hole and a lower mounting hole, the upper mounting hole and the lower mounting hole are arranged on the support base at intervals along a vertical direction, and the support rod may be selectively connected with the upper mounting hole or the lower mounting hole to adjust the inclination angle of the solar panel. Through a technical scheme provided by this disclosure, problems in an (Continued)

existing technology that the transportation is inconvenient and the power generation efficiency is low may be solved.

12 Claims, 7 Drawing Sheets

(56) References Cited

U.S. PATENT DOCUMENTS

| | | | | |
|---|---|---|---|---|
| 8,056,871 | B2 * | 11/2011 | Matias | F16M 11/10 |
| | | | | 248/176.1 |
| D697,864 | S * | 1/2014 | McGrath | D13/102 |
| 10,293,396 | B2 * | 5/2019 | Smith | G02B 5/08 |
| 11,300,979 | B2 * | 4/2022 | Kesler | F24S 50/20 |
| 11,394,342 | B2 * | 7/2022 | Luis y Prado | H02S 40/10 |
| 2008/0282940 | A1 * | 11/2008 | Marion | A47B 23/00 |
| | | | | 108/50.01 |

OTHER PUBLICATIONS

NaturePower (https://web.archive.org/web/20200506102508/https://www.homedepot.com/p/NATURE-POWER-110-Watt-Polycrystalline-Solar-Panel-with-300-Watt-Power-Inverter-and-11-Amp-Charge-Controller-53110/311140967.*

NaturePower (https://web.archive.org/web/20200506102508/https://www.homedepot.com/p/NATURE-POWER-110-Watt-Polycrystalline-Solar-Panel-with-300-Watt-Power-Inverter-and-11-Amp-Charge-Controller-53110/311140967, Title Date: May 6, 2020.*

* cited by examiner

SOLAR DEVICE WITH INCLINATION ADJUSTING SUPPORT ASSEMBLY

CROSS-REFERENCE TO RELATED APPLICATION

This application claims the priority of Chinese patent application No. 202122310242.9 entitled "Solar Device", filed on Sep. 23, 2021, which is incorporated in its entirety herein by reference.

TECHNICAL FIELD

The disclosure relates to a technical field of solar energy, and in particular to a solar device.

BACKGROUND

With the development of a battery piece, series connection and lamination technologies and the like, solar products are widely used, especially in the civilian field, and become more and more popular. People may not go on a tour outdoors without a power source. The solar panel products made of a glass pane in the early days may also supply power, the said products are bulky, large, and easy to hurt people or objects, and the number of users and fields are limited. Slowly, a type of the solar panel product with light weight, small volume, convenient carry and power generation is introduced in different ways. Herein, most of panel decorations are mainly hand-sewn Oxford cloth, and some are in the manner of laminating high-temperature cloth.

Solar panel placement modes include: laying the solar panel flat on the ground, or hooking the solar panel with a fixing button to hang the solar panel, or placing the solar panel on a metal bracket or sewing a Poly Ethylene (PE) panel on the back of the solar panel and supporting it to the ground and the like. By a scheme of placing the solar panel on the bracket, a device is relatively large in overall volume, and inconvenient for transportation, and an inclination angle of the solar panel may not be adjusted, so that the power generation efficiency of the solar panel is low.

SUMMARY

The disclosure provides a solar device, so as to solve problems in an existing technology that the transportation is inconvenient and the power generation efficiency is low.

The disclosure provides a solar device, the solar device includes: a solar panel, being provided with a first surface and a second surface arranged oppositely with each other; and a support assembly, used to support the solar panel, wherein the support assembly includes a support base and a support rod, the support base is arranged on the second surface, the support base is provided with an upper mounting hole and a lower mounting hole, the upper mounting hole and the lower mounting hole are arranged on the support base at intervals along a vertical direction, and the support rod is able to selectively connected with the upper mounting hole or the lower mounting hole, to adjust an inclination angle of the solar panel.

In some embodiments, a central axis of the upper mounting hole is upwards inclined relative to a bottom surface of the support base, and a central axis of the lower mounting hole is downwards inclined relative to the bottom surface of the support base.

In some embodiments, in a clockwise direction, the central axis of the upper mounting hole forms an included angle of 100° to 110° relative to the bottom surface of the support base, the central axis of the lower mounting hole forms an included angle of 55° to 75° relative to the bottom surface of the support base, a depth of the upper mounting hole and a lower mounting hole is 19-22 mm, and a height of the support base is 20-25 mm.

In some embodiments, there are two support bases, and two left and right support bases are symmetrically arranged in a horizontal direction, and the bottom surface of the support base is of elliptic-shaped, and an area of the bottom surface of the support base is greater than an area of a top surface of the support base, and the support base is adhered on the second surface by a photovoltaic sealant.

In some embodiments, a mounting center of the support base is located above a center line of the solar panel, and a distance between the mounting center and the center line is at one-tenth to one-sixth of a height of the solar panel, and distances of the two support bases from left and right edges of the solar panel are equal.

In some embodiments, the support rod is able to selectively connected with the upper mounting hole or the lower mounting hole through a connecting structure, the support rod is a round tube composed of a hollow aluminum oxide profile, a thickness of the hollow aluminum oxide profile is 0.7-1.2 mm, and a diameter of the round tube is 6-16 mm.

In some embodiments, the connecting structure includes a first connecting portion located in the upper mounting hole and the lower mounting hole, and a second connecting portion located in an end portion of the support rod, the second connecting portion is cooperated with the first connecting portion.

In some embodiments, the first connecting portion includes a first thread, a first elastic protrusion, or a first groove, and the second connecting portion includes a second thread cooperated with the first thread, a second groove cooperated with the first elastic protrusion or a second elastic protrusion cooperated with the first groove.

In some embodiments, the other end, opposite to an end portion connected with the upper mounting hole and the lower mounting hole, of the support rod is provided with a ground leg.

In some embodiments, the support base is provided with an accommodating portion for accommodating the support rod, the accommodating portion includes a clamping groove, and the support rod is able to be locked in the clamping groove.

In some embodiments, there are two support bases, and two left and right support bases are symmetrically arranged in a horizontal direction, there are two clamping grooves which are respectively arranged on two opposite side edges of the two left and right support bases, and two end portions of the support rod are respectively clamped in the two clamping grooves located on the two side edges.

In some embodiments, the inclination angle of the solar panel is 20°-30°, or 40°-50°.

In some embodiments, the solar panel includes an edging protector, and the edging protector is a U-shaped protective strip with a built-in steel belt.

In some embodiments, the solar device includes a plurality of solar panels, and the plurality of solar panels is connected by connecting sheets and fasteners.

A technical scheme of the disclosure is applied, the support base is fixed on the second surface, and the support base is provided with the upper mounting hole and the lower mounting hole, the support rod is connected with the upper mounting hole or the lower mounting hole, so that the support rod is able to cooperate with the upper mounting hole or the lower mounting hole to adjust the inclination angle of the solar panel, and it may satisfy the requirements of different sun irradiation angles, thereby the power generation efficiency is improved. Moreover, in the disclosure, the support rod is detachably connected with the support base, so that the device structure may be simplified. While the support rod is not used, the support rod may be detached from a support position, as to reduce the overall volume of the solar panel, which is convenient for transporting it. Through the above device, the support requirements and transportation requirements of the solar panel may be satisfied.

BRIEF DESCRIPTION OF THE DRAWINGS

Drawings of the description constituting a part of the disclosure are used to provide further understanding of the disclosure. Exemplary embodiments of the disclosure and descriptions thereof are used to explain the disclosure, and do not constitute improper limitation to the disclosure. In the drawings.

Wherein, the above drawings include the following reference signs:

10. Solar panel; 11. First surface; 12. Second surface;

20: Support assembly; 21: Support base; 211a: Upper mounting hole; 211b: Lower mounting hole; 212: clamping groove; 213: Bottom surface; 214: Top surface; 22: Support rod; 221: ground leg;

30: Edging protector; 41: Connecting sheet; and 42: Fastener.

DETAILED DESCRIPTION OF THE EMBODIMENTS

Technical schemes in embodiments of the disclosure are clearly and completely described below with reference to drawings in the disclosure. Apparently, the described embodiments are only a part of the embodiments of the disclosure, and not all of the embodiments. The following description of at least one exemplary embodiment is actually only illustrative, and in no way serves as any restriction on the disclosure and disclosure or use thereof. Based on the embodiments of the disclosure, all other embodiments obtained by those of ordinary skill in the art without creative work shall fall within a scope of protection of the disclosure.

Figure 1:
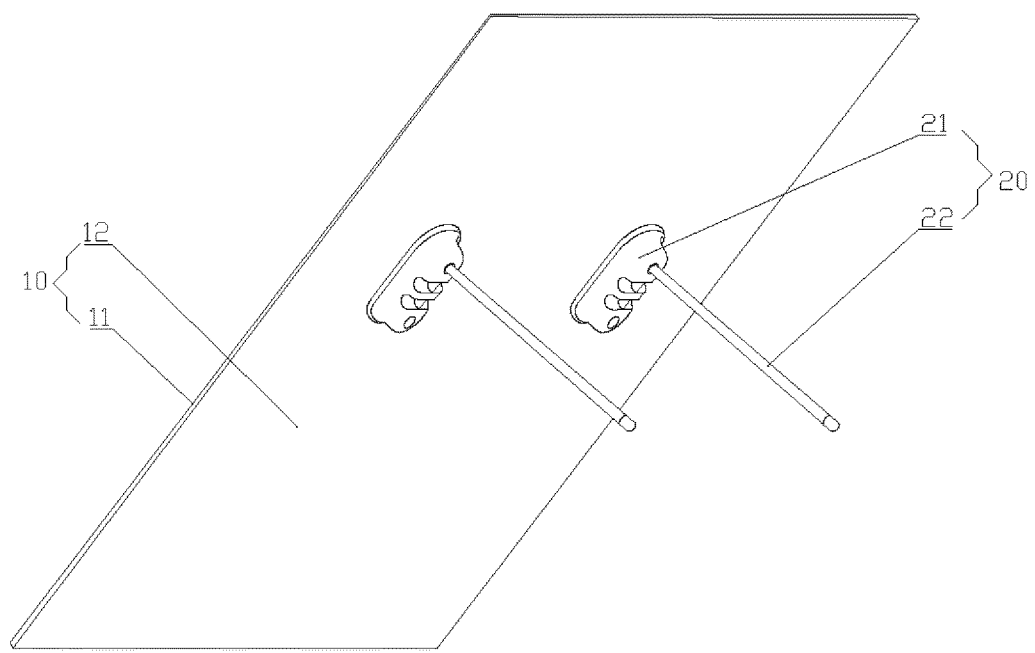
FIG. 1 shows a structure schematic diagram of a solar device according to the disclosure.
Figure 2:
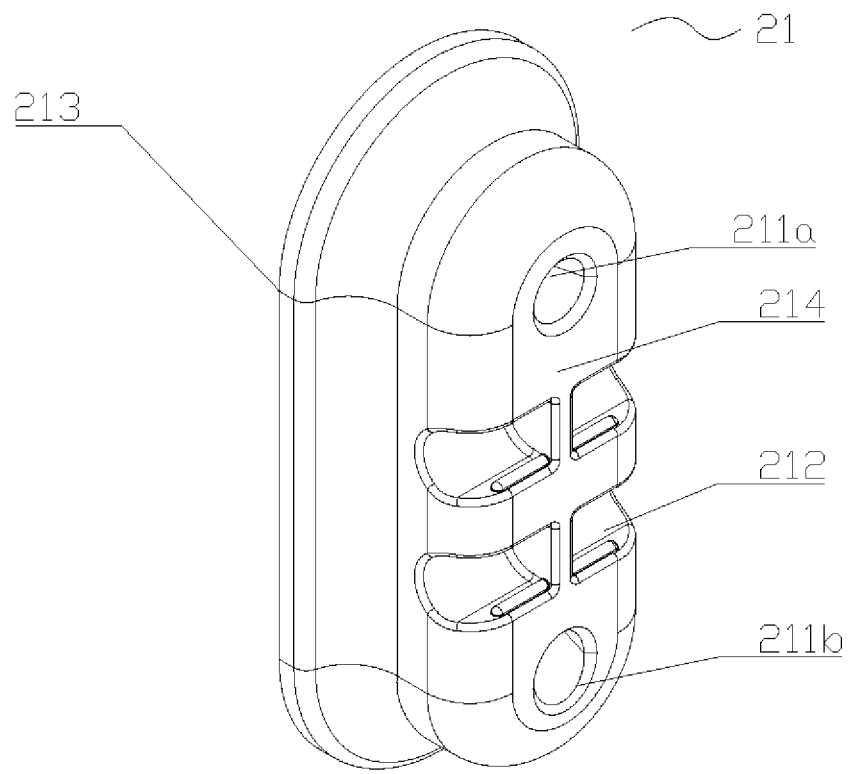
FIG. 2 shows a structure schematic diagram of a support base according to the disclosure.
Figure 3:
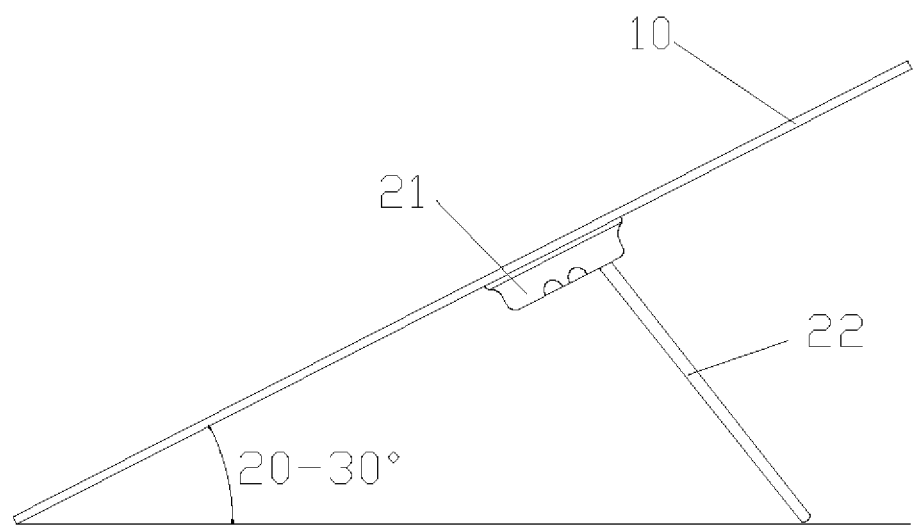
FIG. 3 shows a schematic diagram of a low-angle support state of the solar device according to the disclosure.
Figure 4:
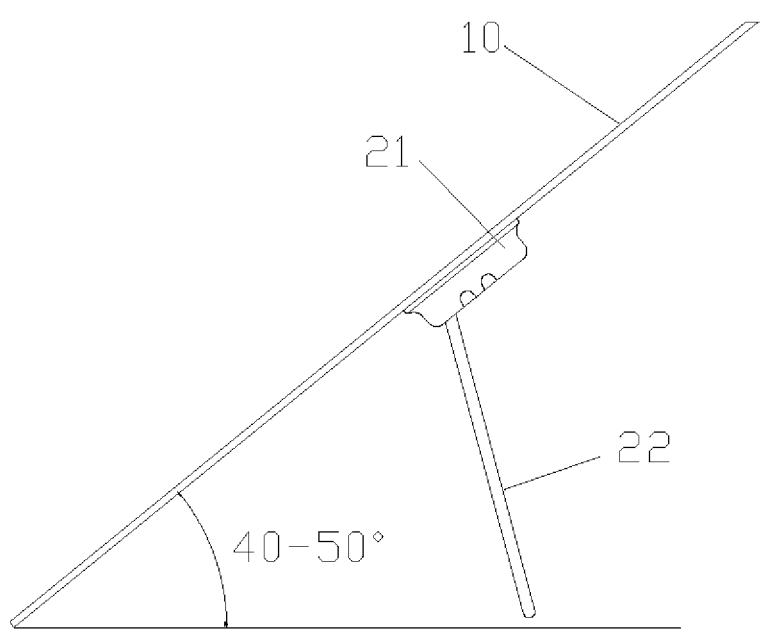
FIG. 4 shows a schematic diagram of a high-angle support state of the solar device according to the disclosure.

As shown in FIG. 1 to FIG. 4, an embodiment of the disclosure provides a solar device, and the solar device includes a solar panel 10 and a support assembly 20. Wherein, the solar panel 10 is provided with a first surface 11 and a second surface 12 arranged oppositely with each other. The support assembly 20 is used to support the solar panel 10, the support assembly 20 includes a support base 21 and a support rod 22, the support base 21 is arranged on the second surface 12, the support base 21 is provided with an upper mounting hole 211a and a lower mounting hole 211b, the upper mounting hole 211a and the lower mounting hole 211b are arranged on the support base 21 at intervals along a vertical direction, the support rod 22 is able to be selectively connected with the upper mounting hole 211a or the lower mounting hole 211b, and the support rod 22 is cooperated with the upper mounting hole 211a or the lower mounting hole 211b to adjust an inclination angle of the solar panel 10. Wherein, there may be a plurality of groups of the upper mounting holes 211a, and there may also be a plurality of groups of lower mounting holes 211b, as to achieve the adjustment of different poses conveniently. By connecting the support rod 22 in the upper mounting hole 211a or the lower mounting hole 211b, the different inclination angles of the solar panel 10 may be adjusted, for example, the solar panel 10 may be inclined by 20°-30° (as shown in FIG. 3), or 40°-50° (as shown in FIG. 4), as to adapt to the different irradiation angles of the sun. Moreover, in the disclosure, the support rod 22 is not in direct contact with the solar panel 10. Instead, a support base 21 is provided, and the solar panel 10 is supported through the cooperation between the support base 21 and the support rod 22, thereby the solar panel 10 is avoided from being damaged, and the service life of the solar panel 10 is further improved.

Through the scheme provided by the disclosure, the support base 21 is fixed on the second surface 12, and the support base 21 is provided with the upper mounting hole 211a and the lower mounting hole 211b, and the support rod 22 is connected with the upper mounting hole 211a or the lower mounting hole 211b, so that the support rod 22 may be cooperated with the upper mounting hole 211a or the lower mounting hole 211b to adjust the inclination angle of the solar panel 10, and it may satisfy the requirements of different sun irradiation angles, thereby the power generation efficiency is improved. Moreover, in the disclosure, the support rod 22 is detachably connected with the support base 21, so that the device structure may be simplified. While the support rod 22 is not used, the support rod 22 may be detached from a support position, as to reduce the overall volume of the solar panel 10, which is convenient for transporting it. Through the above device, the support requirements and transportation requirements of the solar panel 10 may be satisfied.

The power generation efficiency of the solar panel has a great relationship with the angle at which sunlight irradiates to the solar panel. Generally, while the solar panel is perpendicular to a solar irradiation surface, the generating capacity of a solar cell panel is maximal. Therefore, through the technical scheme provided by the disclosure, by the cooperation of the support base 21 and the support rod 22, the support rod 22 is used to connect with the different mounting holes so as to achieve the purpose of adjusting the angle of the solar panel, so that the solar panel may be as vertical as possible to the solar irradiation surface, as to improve the power generation efficiency of the solar panel.

Figure 5:
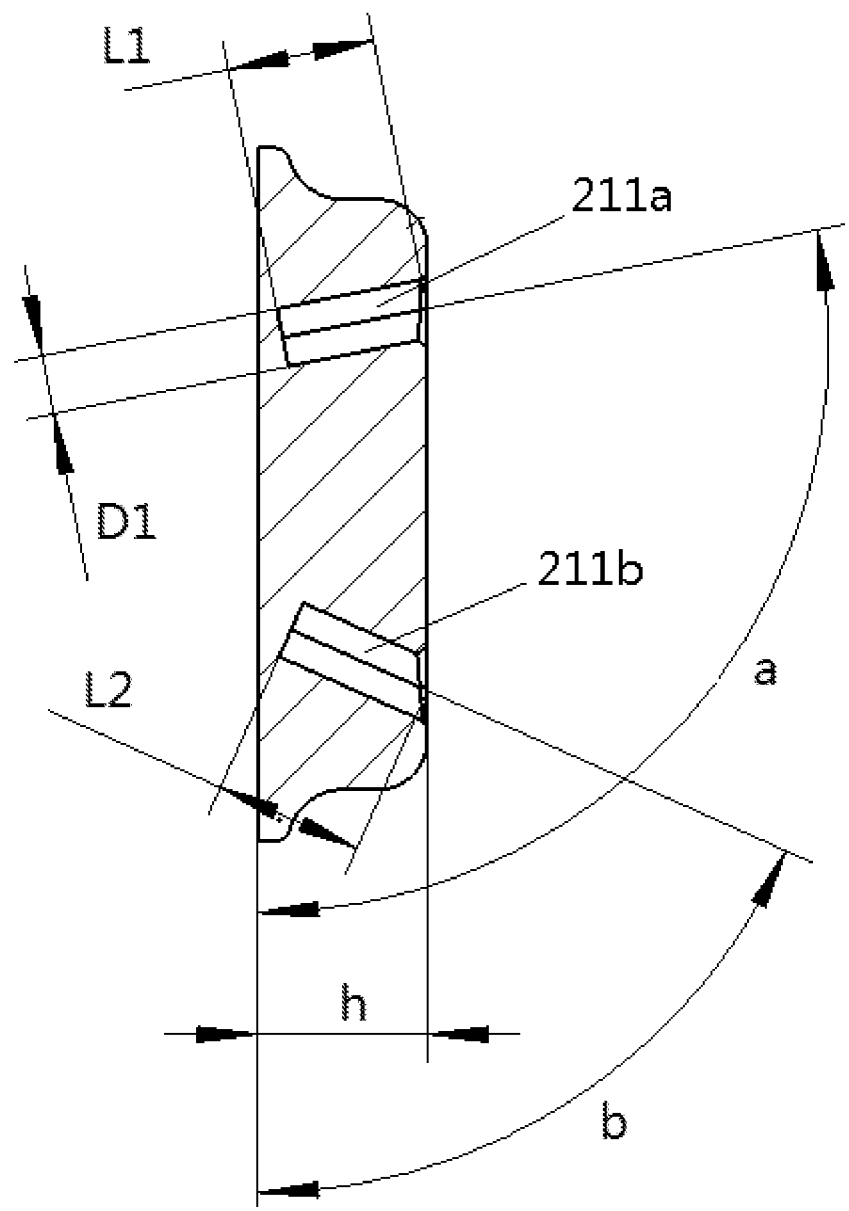
FIG. 5 shows a cross-sectional view of the support base in FIG. 1.

According to the disclosure, a central axis of the upper mounting hole 211a is upwards inclined relative to a bottom surface of the support base 21, and a central axis of the lower mounting hole 211b is downwards inclined relative to the bottom surface of the support base 21. Preferably, as shown in FIG. 5, in a clockwise direction, the central axis of the upper mounting hole 211a forms an included angle of 100° to 110° relative to the bottom surface of the support base 21, and the central axis of the lower mounting hole 211b forms an included angle of 55° to 75° relative to the bottom surface of the support base 21. In this way, the included angle between the two mounting holes may be increased, thereby the adjustment range of the solar panel may be increased. In addition, the inclined arrangement of the upper mounting hole 211a and the lower mounting hole 211b may increase the contact area of the support rod 22 with the upper mounting hole 211a and the lower mounting hole 211b within a limited range, and increase the bonding strength of the support rod 22 with the upper mounting hole 211a and the lower mounting hole 211b, and the thickness of the upper mounting hole 211a and the lower mounting hole 211b may not be increased at the same time.

Specifically, if the depth of the support rod 22 inserted into the hole is not enough, it may not have a sufficient support, and the solar panel 10 may be collapsed. If the insertion is too deep, the product size and product height need to be increased, because the depth of the mounting hole may affect the depth of the support base 21, and the size of an entire product may be affected, it does not meet the design requirements from a cost perspective. Therefore, in the disclosure, the inserting hole angle and the hole depth are set within the above range, the stability of the support for the solar panel 10 may be improved, and the product cost may be reasonably controlled, so the product is minimized as much as possible. However, if the angle range described in the disclosure is exceeded, the support function may not be achieved, it is caused that the product is collapsed or the strength of the support base needs to be improved, thereby the cost of the product is increased.

Wherein, in other embodiments not shown in the figure, the support rod 22 may be set as a structure with an adjustable length, so that the inclination angle of the solar panel 10 may be conveniently adjusted, as to further increase the inclination angle range of the solar panel 10, and adjustment modes are enriched. Specifically, the support rod 22 may be a telescopic rod or a folding rod, or may also be set as a plurality of support sections that may be detachably connected, and the number of the support sections is selected according to the needs.

It is specifically described below with reference to FIG. 5: in FIG. 5, L1 represents the length of the upper mounting hole 211a, L2 represents the length of the lower mounting hole 211b, D1 represents the diameter of the upper mounting hole 211a, and h represents the thickness of the support base 21. In the disclosure, the bottom of the support base 21 is a flat surface. Therefore, the included angle between the axis of the upper mounting hole 211a and the bottom surface of the support base 21 may be expressed as a, and the included angle between the axis of the lower mounting hole 211b and the bottom surface of the support base 21 may be expressed as b.

According to this embodiment, the depth of the upper mounting hole 211a and the lower mounting hole 211b is 19-22 mm, and the height of the support base 21 is 20-25 mm. The included angle between the upper mounting hole 211a and the bottom surface of the support base 21 may be 100°, 105°, and 110°; and the included angle between the axis of the lower mounting hole 211b and the bottom surface of the support base 21 is 55°, 60°, and 75°. Preferably, the depth of the upper mounting hole 211a and the lower mounting hole 211b may be 19 mm, 20 mm or 22 mm. The consideration of the above specific numerical value setting is that the solar panel 10 has a certain weight, and while the solar panel 10 is supported, in addition to the weight of the solar panel 10, a wind resistance pressure, an accessory weight, and a cable pulling force and the like need to be considered, so the support strength of a support structure needs to be improved.

In the disclosure, there are two support bases 21, and two left and right support bases 21 are symmetrically arranged in a horizontal direction, and the bottom surface 213 of the support base 21 is be elliptic-shaped, and the area of the bottom surface 213 of the support base 21 is greater than the area of a top surface 214 of the support base 21, and the support base 21 is adhered on the second surface 12 by a photovoltaic sealant.

Through the above structure, the gluing area while the support base 21 is connected to the second surface 12 may be increased, and it is beneficial to enhance the fixing strength. In addition, an existing product is made by sewing a support plate on cloth or separately equipped with a set of a support bracket. The former requires a piece of the cloth as a fixing carrier, and it may not be achieved if the cloth or other modes of the carriers are removed; and the latter requires a bracket equipped separately, it may not only increase parts and cause inconvenience to product packaging, but also affect use experience effects of customers. Therefore, the gluing mode is the most effective connection mode without sewing cloth or other fixing carriers.

Preferably, the height of the support base 21 may be set between 20 mm and 25 mm. If the height of the support base 21 is less than 20 mm, the structural strength of the support base 21 is difficult to guarantee; and if the height of the support base 21 is greater than 25 mm, the overall volume of the device may be increased, and the production cost is increased. Therefore, the height of the support base 21 is set between 20 mm and 25 mm, it may not only guarantee the structural strength of the support base 21, but also prevent the support base 21 from occupying too much space, and reduce the overall volume of the device as much as possible, so the production cost is saved. Specifically, the height of the support base 21 may be 20 mm, 22 mm, and 25 mm.

In the disclosure, a mounting center of the support base 21 is located above a center line of the solar panel 10, and a distance between the mounting center and the center line is one-tenth to one-sixth of the height of the solar panel 10, and distances of the two support bases 21 from left and right edges of the solar panel 10 are equal. Such arrangement may improve the stability of the support for the solar panel 10, and the arrangement position of the support base 21 is higher, the requirement of the support base 21 for strength is higher, the design cost is increased, and the length of the support rod 22 needs to be increased correspondingly, so the product cost is further increased. Therefore, the support base 21 is set within the above height range, it may not only guarantee the stability of the support for the solar panel 10, but also save the cost.

Wherein, the support rod 22 may be selectively connected with the upper mounting hole 211a or the lower mounting hole 211b through a connecting structure, the support rod 22 is a round tube composed of a hollow aluminum oxide profile, the thickness of the hollow aluminum oxide profile is 0.7-1.2 mm. and the diameter of the round tube is 6-16 mm. The select material of the support rod 22 is the hollow aluminum oxide profile, and it has the advantages of light weight, firmness, corrosion resistance, aging resistance and low cost. The above material structure is rarely used in existing products, and the use of other metal materials has defects such as high cost, heavy weight, and rusting. For example, if a plastic material is used, there may be disadvantages such as easy deformation, easy breakage, and poor aging properties. The shape of the tube is designed to be round, such that it is easy to pull and insert, and the tail may be tapped. It may be screwed tightly by a screw thread, which is more firm. The round tube is also easy to process and produce. The sizes of the diameter and thickness of the support rod 22 affect the support strength and cost. If the size is too small, the support rod may not be able to support the solar panel with a certain weight, and is easy to break; and if the size is too large, it may affect the product cost, weight and overall aesthetic coordination degree. The length of the support rod 22 determines the generation power of the solar panel. If the length of the support rod 22 is too short, it does not have a support function; and if the length of the support rod 22 is too long, the solar panel has a larger generation power, and is not convenient to carry. The actual application field is narrower, and such a structure is unstable, so it is not recommended to design and use.

Wherein, the select material and size of the support rod 22 may be specifically adjusted according to the support strength, cost, and size of the solar panel. Specifically, the diameter of the support rod 22 may be 6 mm, 10 mm, 14 mm, and 16 mm; the wall thickness of the solar panel 10 may be 0.7 mm, 0.8 mm, 1 mm, and 1.2 mm; and the length of the support rod 22 may be 120 mm, 250 mm, 350 mm, and 500 mm.

Wherein, in order to improve the stability of connection between the support rod 22 and the mounting hole, a first connecting portion may be arranged in the upper mounting hole 211a and the lower mounting hole 211b, and an end portion of the support rod 22 is provided with a second connecting portion, so as to connect through the cooperation of the first connecting portion and the second connecting portion. Specifically, the first connecting portion may include a first thread, a first elastic protrusion, or a first groove, and the second connecting portion includes a second thread cooperated with the first thread, a second groove cooperated with the first elastic protrusion, or a second elastic protrusion cooperated with the first groove. Certainly, the support rod 22 may also be fixed in the mounting hole by a locking member. Specifically, the locking member has a locked state and an unlocked state. In the locked state, the support rod 22 may be fixed in the mounting hole; and in the unlocked state, the support rod 22 may be taken out of the mounting hole. Through the above structure, the support rod 22 may be stably connected with the mounting hole, so the stability of the solar panel 10 is further guaranteed while it is placed.

According to a preferred embodiment, both the upper mounting hole 211a and the lower mounting hole 211b are provided with internal threads, and the end portion of the support rod 22 is provided with an external thread, and the support rod 22 is connected with the upper mounting hole 211a and the lower mounting hole 211b through the thread fit. Specifically, the internal threads are arranged at tail ends of the upper mounting hole 211a and the lower mounting hole 211b. Such a design may improve the stability of the connection between the support rod 22 and the mounting hole, and reduce the length of the internal thread as much as possible at the same time, so that the support rod 22 is conveniently detached and assembled. In addition to the external thread arranged on the end portion of the support rod 22, the surface may also be oxidized to make it resistant to corrosion and aging, the service life is improved.

Wherein, the length of the thread is set to be 5 mm to 10 mm. Specifically, the length of the thread may be 5 mm, 8 mm or 10 mm.

Figure 10:
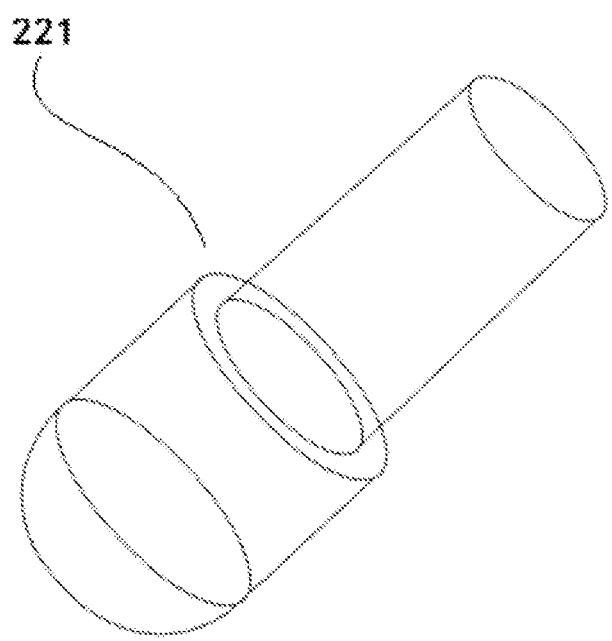
FIG. 10 shows a schematic diagram of the ground leg according to the disclosure.

Further, as shown in FIG. 10, the other end, connected with the mounting hole, of the support rod 22 is provided with a ground leg 221, and the ground leg 221 is directly in contact with the ground, the wear resistance of the ground leg 221 is good, and the friction with the ground is increased. If necessary, the connecting ground leg 221 may be inserted into the loosen ground, as to improve the support stability.

Figure 6:
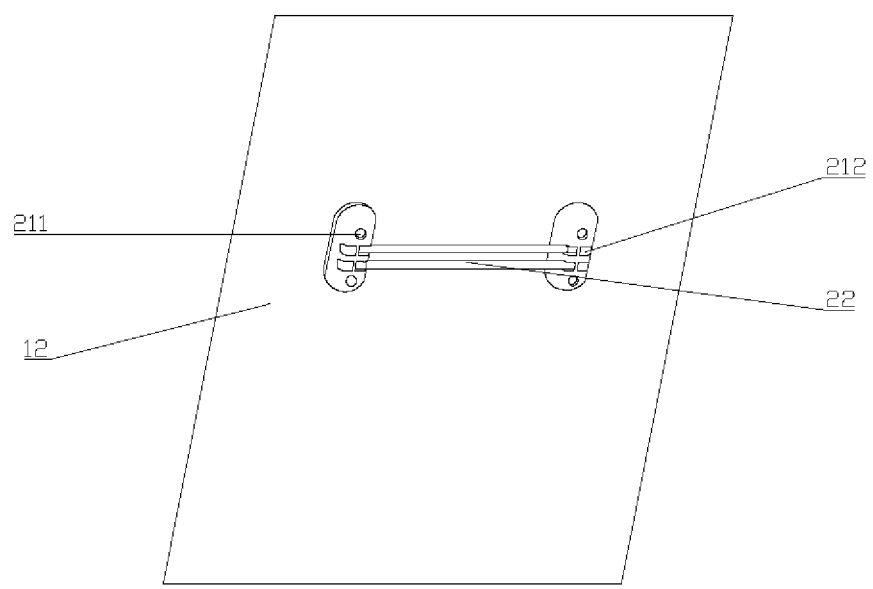
FIG. 6 shows a structure schematic diagram, in which the solar device according to the disclosure is stored.
Figure 7:
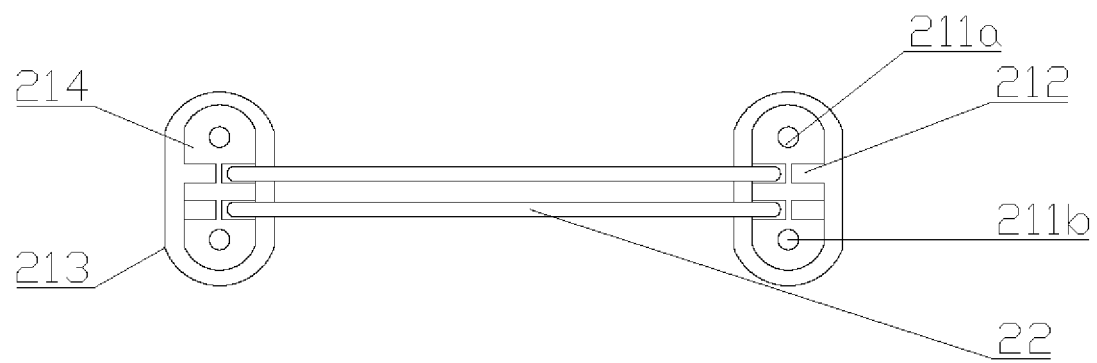
FIG. 7 shows a structure schematic diagram of the support base and a support rod in FIG. 6.

As shown in FIG. 2, FIG. 6 and FIG. 7, the support base 21 is also provided with an accommodating portion for accommodating the support rod 22, the accommodating portion includes an elastic clamping groove 212, and the support rod 22 may be clamped in the clamping groove 212. While the support rod 22 is not needed for support, the support rod 22 may be received in the accommodating portion, and the solar panel 10 and the support rod 22 may be placed and transported uniformly, it is convenient for managing the device.

Specifically, there are two support bases 21, and two left and right support bases 21 are symmetrically arranged in the horizontal direction, and there are two clamping grooves 212 which are respectively arranged on two opposite side edges of the two left and right support bases 21, and two end portions of the support rod 22 are respectively clamped in the two clamping grooves 212 located on the two side edges. Through the above structure, the support rod 22 may be attached to the solar panel 10, the support rod 22 is avoided from being lost, and the clamping grooves 212 are added in a space of the support base 21 itself, as to make full use of the own space. Specifically, a clamp buckle may be arranged in the clamping groove 212, the clamp buckle has elasticity, the support rod 22 may be fixed in the clamping groove 212 by using the clamp buckle, and the support rod 22 may be clamped or taken out with a little external force during use. Through the above design, the accommodating portion is designed as the clamping groove 212, it may not only accommodate the support rod 22, but also may be locked and fixed with the support rod 22 by using the clamping groove 212, the structure thereof is simple, and it is convenient for storage.

Through the above support structure, the support inclination angle of the solar panel 10 may be adjusted within the range of 20° to 50° in cooperation with the support rod 22. Specifically, the lower mounting hole 211b may be used to enable the support inclination angle of the solar panel 10 to be between 40° and 50°, and the upper mounting hole 211a is used to enable the support inclination angle of the solar panel 10 to be between 20° and 30°.

In the disclosure, the use of two mounting hole structures with different inclination angles is determined for countries in which portable solar products are more widely used at present, and the countries are mainly located in the northern hemisphere, especially the United States. The included angle between the solar panel surface and the horizontal ground is called as the inclination angle, and the inclination angle has a great relationship with the power generation efficiency of the solar panel. The best inclination angle is also related to a local geographic latitude. While the latitude is higher, the corresponding inclination angle is also large. As an example, major cities in the United States, the United Kingdom, France, Germany, and Canada are mostly distributed above north latitude 30°, so priority is given to the range of north latitude 30-50°, and the inclination angle is comprehensively considered to select the two angle ranges of 20° to 30° and 40° to 50°, 20° to 30° take into account low latitude areas, and 40° to 50° take into account high latitude areas. In addition, another consideration is that these two angle ranges are more appropriate values during a daily movement process of the sun from east to west. Therefore, through the design of the inclination angle of the mounting hole and the size design of the support rod 22 in the disclosure, the inclination angle supported by the solar panel may be within the two adjustment angle ranges of 20-30° and 40-50°, thereby the power generation efficiency of the solar panel is improved as much as possible.

Specifically, while the sun is in the morning and evening, the sunlight irradiation angle is small. At this time, the angle of the solar panel may be adjusted to the range of 40° to 50°, as to increase the irradiation area of the solar panel 10 irradiated. Specifically, the support rod 22 is used to connect with the lower mounting hole 211b on the support base 21, as to increase the inclination angle of the solar panel 10, thereby the irradiation area of the solar panel 10 irradiated by sunlight is increased; and while the sun is at noon, the sunlight irradiation angle is larger or perpendicular to the ground. At this time, the angle of the solar panel may be adjusted to the range of 20° to 30°, so that the solar panel 10 may fully absorb solar energy. Specifically, the support rod 22 is used to connect with the upper mounting hole 211a on the support base 21, as to reduce the inclination angle of the solar panel 10, so that more sunlight may irradiate on the solar panel 10.

Figure 8:
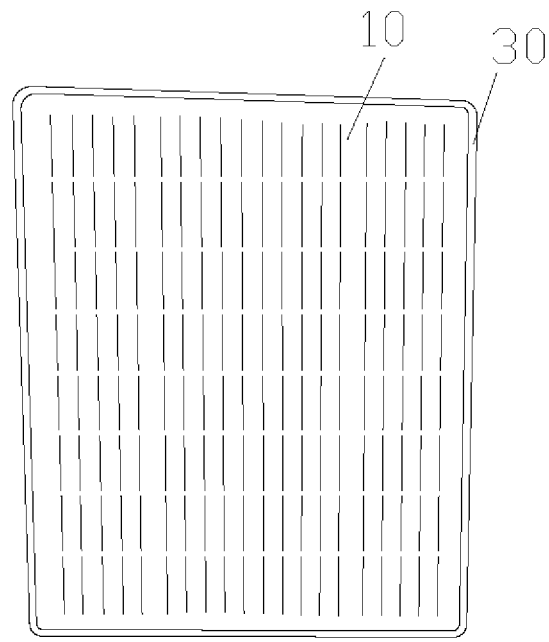
FIG. 8 shows an assembly schematic diagram of a solar panel and an edging protector according to the disclosure.

As shown in FIG. 8, in this embodiment, in order to protect the solar panel 10, the outer periphery of the solar panel 10 may also be provided with an edging protector 30, and an outer edge of the solar panel 10 is wrapped by the edging protector 30. Specifically, the cross-sectional shape of the edging protector 30 is U-shaped, and it is made of an Ethylene Propylene Diene Monomer (EPDM) material. The material has excellent ultraviolet (UV) resistance, and has good weather resistance, heat aging resistance, low temperature resistance, ozone resistance, chemical resistance, water resistance and other physical and mechanical properties. A steel belt frame may also be arranged inside the edging protector 30, as to increase a clamping force, prevent it from falling off, and facilitate the bending and fixing of corners. Wherein, the height of the edging protector 30 may be set between 8 mm and 25 mm, and the width of the edging protector 30 may be set between 5 mm and 15 mm, it may be specifically designed according to the size of the solar panel 10 and the protection requirements.

Figure 9:
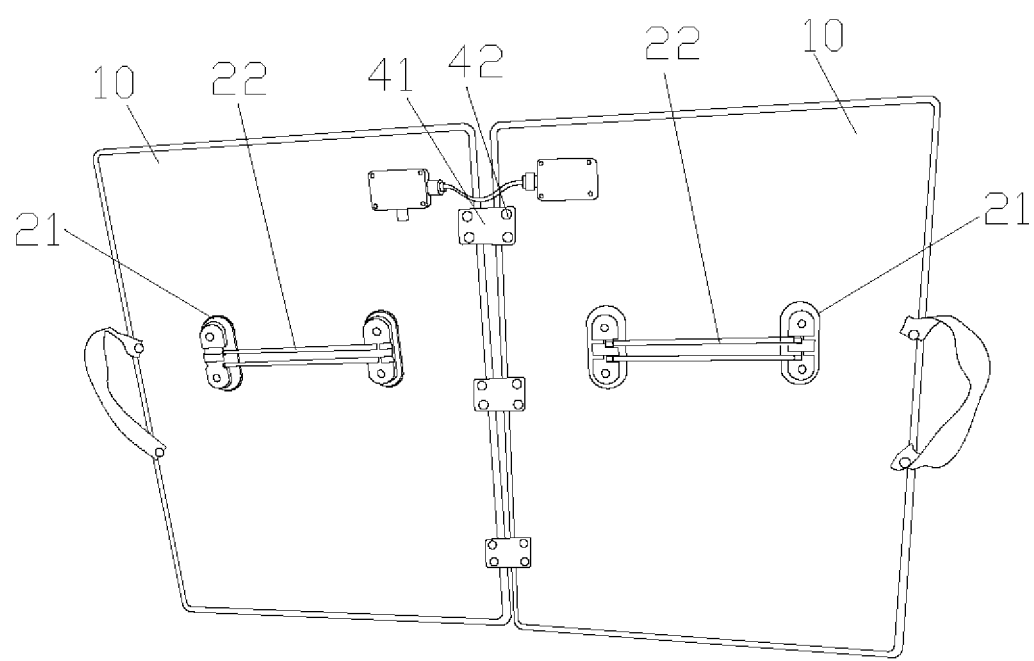
FIG. 9 shows a schematic diagram of interconnection of the two solar panels according to the disclosure.

As shown in FIG. 9, the solar device may include a plurality of solar panels 10, the solar panel 10 may also be provided with a connecting sheet 41, and two adjacent solar panels 10 may be connected together by arranging the connecting sheet 41. Specifically, the connecting sheet 41 is arranged on the back of the two adjacent solar panels 10, and the connecting sheet 41 is fixed on the two adjacent solar panels 10 by fastening a fastener 42. The connecting sheet 41 may be made of a nylon or imitation nylon material, and it has the advantages of firmness, good weather resistance, lightweight and the like. The fastener 42 may use a stainless steel self-locking screw 304 to butt a rivet, and the advantages thereof are that it may be operated with an electric screwdriver, is convenient for production and has good tightness. In addition, a stainless steel material meets the requirements of outdoor use, and the appearance may also match the product.

It should be noted that terms used here are only for describing the specific embodiments, and are not intended to limit the exemplary embodiments according to the disclosure. As used herein, unless clearly indicated otherwise in the context, a singular form is also intended to include a plural form. In addition, it should also be understood that while the term "comprising" and/or "including" is used in this description, it indicates that there are features, steps, operations, devices, components, and/or combinations thereof.

Unless specifically stated otherwise, the relative arrangement of the components and steps, numerical expressions and numerical values elaborated in these embodiments do not limit a scope of the disclosure. At the same time, it should be understood that, for ease of description, the sizes of the various portions shown in the drawings are not drawn in accordance with actual proportional relationships. Technologies, methods, and devices known to those of ordinary skill in the art may not be discussed in detail, but in the appropriate case, the technologies, methods and devices should be regarded as a part of the authorized description. In all examples shown and discussed herein, any specific values should be interpreted as merely exemplary, rather than as limitation. Therefore, other examples of the exemplary embodiment may have different values. It should be noted that: similar reference signs and letters indicate similar items in the following drawings, and therefore, once a certain item is defined in one drawing, it does not need to be further discussed in the subsequent drawings.

In the description of the disclosure, it needs to be understood that the orientation or position relationship indicated by orientation words such as "front, back, up, down, left, right", "transverse, vertical, perpendicular, horizontal" and "top, bottom" is usually based on the orientation or position relationship shown in the drawings, it is only for the convenience of describing the disclosure and simplifying the description. Unless otherwise stated, these orientation words do not indicate or imply that the device or element referred to must have a specific orientation or be constructed and operated in the specific orientation, so it may not be understood as limitation to a scope of protection of the disclosure; and the orientation words "inner and outer" refer to the inside and outside relative to the contour of each component itself.

For ease of description, spatial relative terms may be used here, such as "on", "above", "on the upper surface", and "upper", to describe the spatial position relationship between one device or feature as shown in the figure and other devices or features. It should be understood that the spatial relative terms are intended to encompass different orientations in use or operation other than the orientation of the device described in the figure. For example, if the device in the drawing is inverted, then a device described as "above other devices or structures" or "on other devices or structures" may be positioned as "below other devices or structures" or "under other devices or structures" later. Thus, the exemplary term "above" may include both orientations "above" and "below". The device may also be positioned in other different ways (rotated by 90 degrees or in other orientations), and the spatial relative description used here shall be explained accordingly.

In addition, it should be noted that the use of terms such as "first" and "second" to define parts is only for the convenience of distinguishing the corresponding parts. Unless otherwise stated, the above terms have no special meaning and therefore may not be understood as limitation to the scope of protection of the disclosure.

The above are only preferred embodiments of the disclosure, and are not intended to limit the disclosure. For those skilled in the art, the disclosure may have various modifications and changes. Any modifications, equivalent replacements, improvements and the like made within the spirit and principle of the disclosure shall be included in the scope of protection of the disclosure.

What is claimed is:

1. A solar device, wherein the solar device comprises:
a solar panel, being provided with a first surface and a second surface arranged oppositely with each other; and
a support assembly, used to support the solar panel, wherein the support assembly comprises a support base and a support rod, the support base is arranged on the second surface, the support base is provided with an upper mounting hole and a lower mounting hole, the upper mounting hole and the lower mounting hole are arranged on the support base at intervals along a vertical direction, and the support rod is able to be selectively connected with the upper mounting hole or the lower mounting hole, to adjust an inclination angle of the solar panel;
wherein a central axis of the upper mounting hole is upwards inclined relative to a bottom surface of the support base, and a central axis of the lower mounting hole is downwards inclined relative to the bottom surface of the support base;
in a clockwise direction, the central axis of the upper mounting hole forms an included angle of 100° to 110° relative to the bottom surface of the support base, the central axis of the lower mounting hole forms an included angle of 55° to 75° relative to the bottom surface of the support base.

2. The solar device as claimed in claim 1, wherein, a depth of the upper mounting hole and a lower mounting hole is 19-22 mm, and a height of the support base is 20-25 mm.

3. The solar device as claimed in claim 2, wherein there are two support bases, and the two support bases comprise a left support base and a right support base which are symmetrically arranged in a horizontal direction, and an area of the bottom surface of the support base is greater than an area of a top surface of the support base, and the support base is adhered on the second surface by a photovoltaic sealant.

4. The solar device as claimed in claim 3, wherein a mounting center of the support base is located above a center line of the solar panel, and a distance between the mounting center and the center line is at one-tenth to one-sixth of a height of the solar panel, and distances of the two support bases from left and right edges of the solar panel are equal.

5. The solar device as claimed in claim 1, wherein the support rod is able to be selectively connected with the upper mounting hole or the lower mounting hole through a connecting structure, the support rod is a round tube composed of a hollow aluminum profile, a thickness of the hollow aluminum profile is 0.7-1.2 mm, and a diameter of the round tube is 6-16 mm.

6. The solar device as claimed in claim 5, wherein the connecting structure comprises a first connecting portion located in the upper mounting hole and the lower mounting hole, and a second connecting portion located in an end portion of the support rod, the second connecting portion is cooperated with the first connecting portion.

7. The solar device as claimed in claim 1, wherein the other end, opposite to an end portion connected with the upper mounting hole and the lower mounting hole, of the support rod is provided with a ground leg.

8. The solar device as claimed in claim 1, wherein the support base is provided with an accommodating portion for accommodating the support rod, the accommodating portion comprises a clamping groove, and the support rod is able to be clamped in the clamping groove.

9. The solar device as claimed in claim 8, wherein there are two support bases, and the two support bases comprise a left support base and a right support base which are symmetrically arranged in a horizontal direction, and there are two clamping grooves which are respectively arranged on two opposite side edges of the support base, and two end portions of the support rod are respectively clamped in the two clamping grooves located on the two side edges.

10. The solar device as claimed in claim 1, wherein the inclination angle of the solar panel is 20°-30°, or 40°-50°.

11. The solar device as claimed in claim 1, wherein the solar panel comprises an edging protector, and the edging protector is a U-shaped protective strip with a built-in steel belt.

12. The solar device as claimed in claim 1, wherein the solar device comprises a plurality of solar panels, and the plurality of solar panels is connected by connecting sheets and fasteners.

* * * * *